Jan. 13, 1959  W. T. STEPHENS  2,868,227
VALVE CONTROLLED UNIT FOR HYDRAULIC MOTORS
Filed April 19, 1954  4 Sheets-Sheet 1

Jan. 13, 1959

W. T. STEPHENS 2,868,227

VALVE CONTROLLED UNIT FOR HYDRAULIC MOTORS

Filed April 19, 1954

INVENTOR
William T. Stephens

BY Mason, Porter, Diller & Stewart

ATTORNEYS

Jan. 13, 1959

W. T. STEPHENS 2,868,227

VALVE CONTROLLED UNIT FOR HYDRAULIC MOTORS

Filed April 19, 1954

INVENTOR
William T. Stephens

BY Mason, Porter, Diller & Stewart

ATTORNEYS

United States Patent Office 2,868,227
Patented Jan. 13, 1959

2,868,227

VALVE CONTROLLED UNIT FOR HYDRAULIC MOTORS

William T. Stephens, Painsville, Ohio, assignor to Parker-Hannifin Corporation, Cleveland, Ohio, a corporation of Ohio Application April 19, 1954, Serial No. 423,881

5 Claims. (Cl. 137—622)

The invention relates to new and useful improvements in a hydraulic valve controlled unit for supplying fluid from a single source to a plurality of motors. In my prior application, Serial No. 369,329, filed July 21, 1953, now Patent No. 2,783,745, there is shown such a unit. The unit includes a housing having ports connected to a plurality of motors and valve controlled means for directing fluid under pressure from a single source selectively or simultaneously to the motors.

An object of the present invention is to provide a valve unit of the above type with additional ports and means for controlling the same whereby two or more valve units can be connected in series, when additional motors are required, and all of the motors selectively operated from the same source of supply.

A further object of the invention is to provide a valve controlled unit of the above type with a port connecting the fluid supply with the exhaust when all valves are closed, and with means for closing said port in the first unit when another unit is connected thereto.

Another object of the invention is to provide a control system for a plurality of motors operated from a single source of supply, wherein a plurality of valve controlled units independently housed are connected in series with the source of supply for directing operating fluid to the motors and wherein each valve controlled unit independently controls the motor with which it is associated.

These and other objects will in part be obvious and will in part be hereinafter more fully described.

In the drawings which show by way of illustration one embodiment of the invention;

The invention relates to improvements in a valve mechanism for controlling the supply of fluid under pressure to one or more hydraulically operated motors. The valve mechanism includes a housing 10 having two bores 11 and 12 extending all the way through the housing. Said bores are parallel and spaced from each other. In the housing is a high pressure supply chamber 13 which extends transversely of the bores and is connected thereto. This chamber provides a means whereby the operating fluid may be supplied to the motor or motors under valve control.

Figure 1:
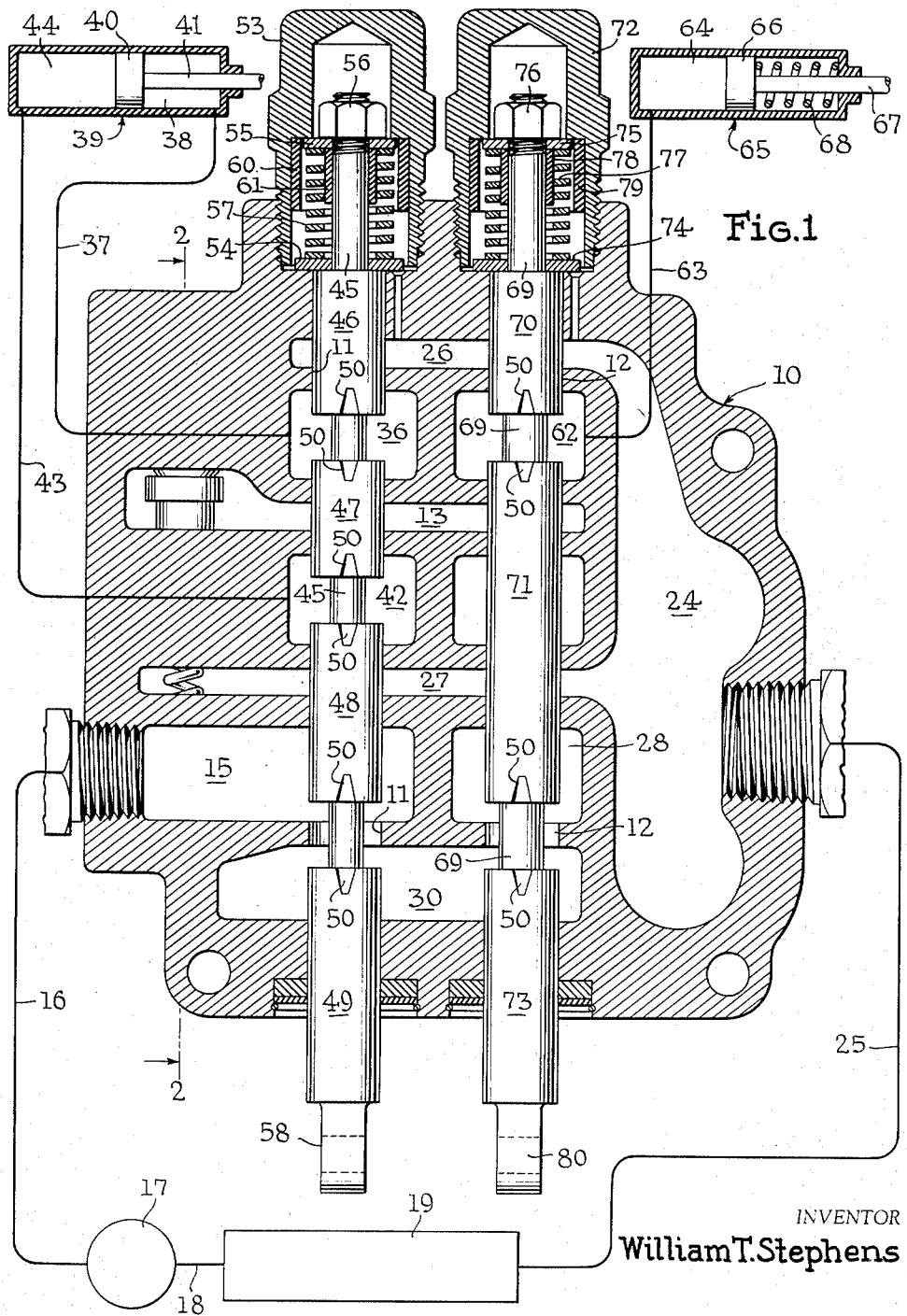
Figure 1 is a sectional view through the housing of a valve controlled unit for hydraulic motors showing the valve controlled ports and their connections to the motors and to a single source of supply.

The chamber 13 is connected through the passage 14 to an intake chamber 15 (see Figure 2) and the intake chamber 15 is connected through a pipe 16 to a pump 17 shown diagrammatically in Figure 1. The pump is connected by a pipe 18 to a tank 19 where the supply fluid is initially stored.

The pump 17 draws fluid from the tank and will deliver the same to the pressure chamber 13 in the housing until the maximum pressure on the fluid in the chamber is that of the maximum pressure of the pump. In order to prevent backflow of fluid from a cylinder port when the latter is initially connected to the supply chamber 13 and during the time when it takes for the pump to build up pressure equal to or in excess of that in the cylinder there is a check valve 20 in the passage 14. This check valve has a cone-shaped end 21 and is normally held closed by the spring 23. As soon as the pump pressure has built up to that within the cylinder to be operated the check valve will open and fluid pressure will flow from the pump to the chamber 13 and then to the cylinder being operated.

Figure 4:
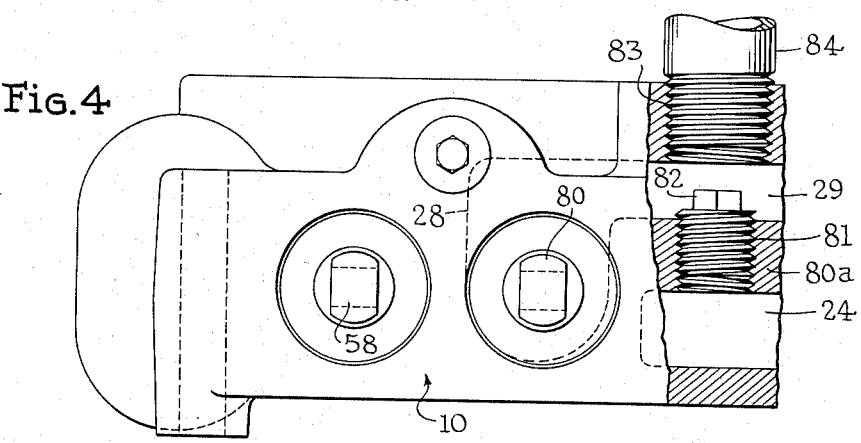
Figure 4 is a view partly in section on the line 4—4 of Figure 3 and partly in end elevation of the housing and showing the improved port arrangement for permitting connection of the units in series.
Figure 5:
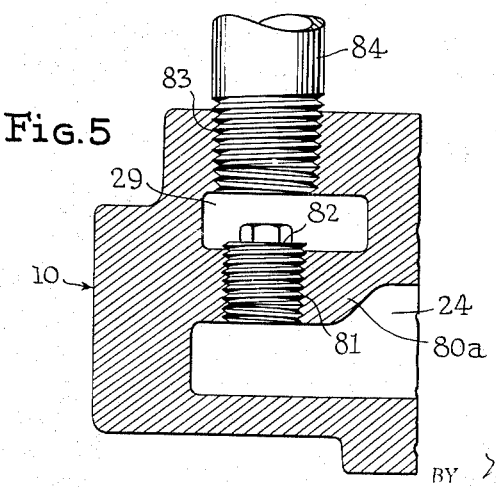
Figure 5 is a sectional view on the line 5—5 of Figure 3.
Figure 3:
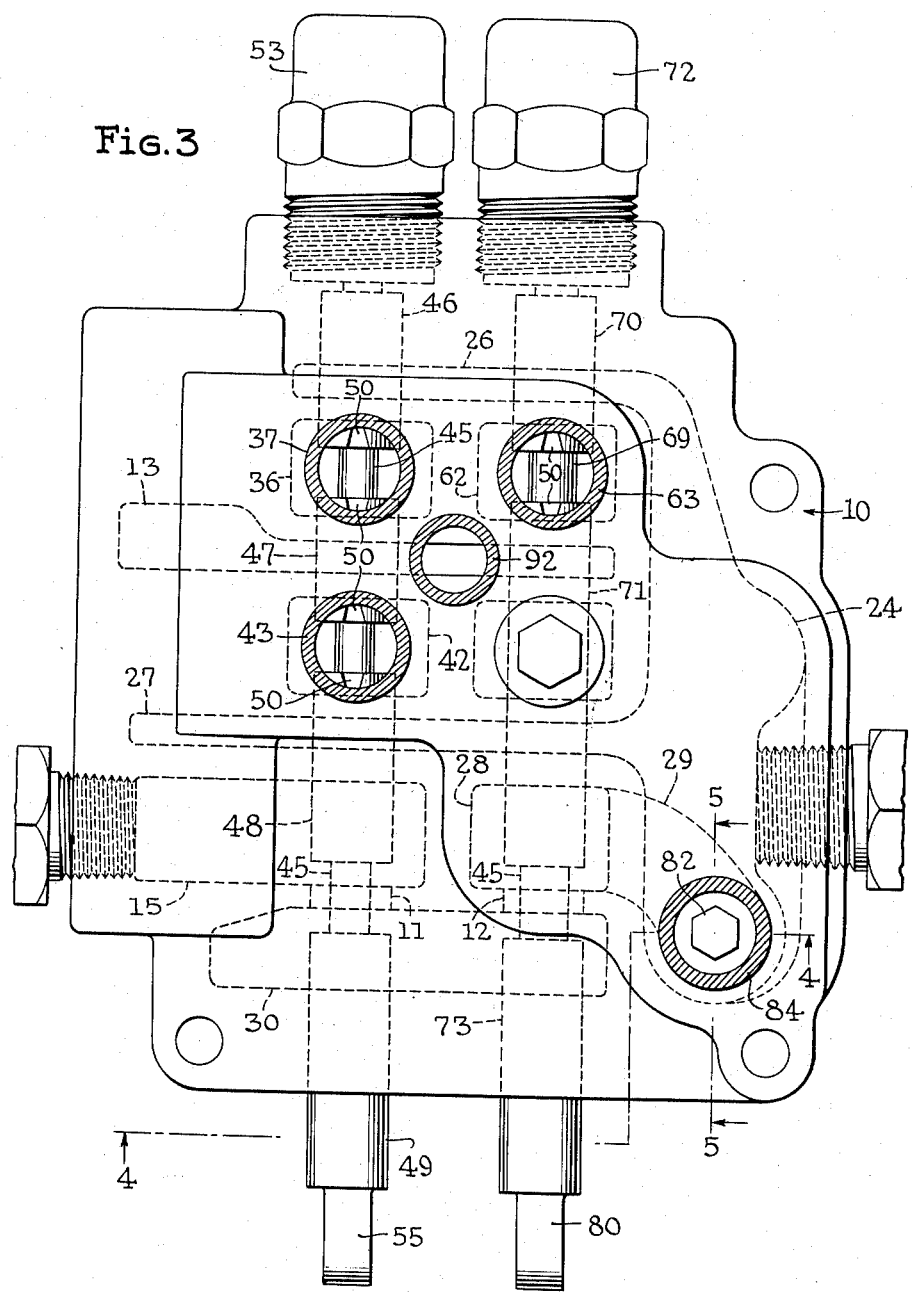
Figure 3 is a top plan view of the housing for the valve controlled unit showing the pipe connections associated therewith for connecting the units in series.

The housing is also provided with an exhaust chamber 24 which is connected through the pipe 25 to the tank 19. This exhaust chamber has branch passages 26 and 27 which extend transversely to the bores and are connected to both of the bores. The bore 12 has an enlarged port or by-pass extension 28 which is illustrated as subject to connection with the exhaust chamber 24 through the passage 29 and as outlined hereinafter. (See Figures 3, 4 and 5.) There is also in the housing 10 a by-pass chamber 30 which extends transversely of the bores 11 and 12 and is connected to each of said bores. This by-pass chamber is connected through the bore 11 with the intake chamber 15 and is also connected through the bore 12 and the port 28 and passage 29 with the exhaust chamber 24 as described hereinafter. This provides a by-pass for the fluid passing from the pump to the chamber 15 when the control valves are in neutral or centered position as will be more fully hereinafter described.

Figure 2:
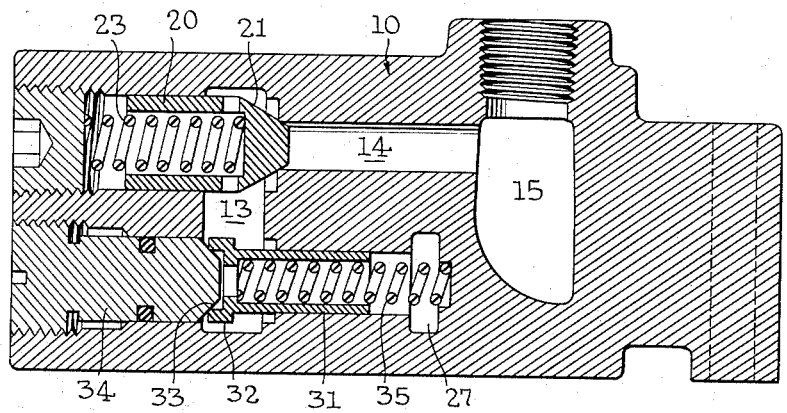
Figure 2 is a sectional view on the line 2—2 of Figure 1 and showing a check valve and a relief valve in the fluid line of the supply to the operating ports.

There is also a passage connecting the chamber 13 with the branch 27 of the exhaust chamber 24 (see Figure 2). This passage is controlled by a relief valve 31. This relief valve is provided with an annular member 32 adapted to engage a tapered seat 33 on a plug 34 threaded into the housing. A spring 35 normally holds the relief valve in engagement with the seat 33 and closes off any connection between the chamber 13 and the branch 27 of the exhaust chamber. The spring is so tensioned that in case the fluid pressure chamber 13 should have a pressure thereon above a desired maximum the valve will open and allow fluid to flow from said fluid pressure chamber 13 to the exhaust chamber until the pressure is lowered to the desired maximum degree.

At one side of the fluid pressure chamber 13 and spaced therefrom the bore 11 has an enlarged port or motor passage 36. This port is connected by a pipe 37 to the end 38 of a hydraulic motor 39 shown diagrammatically in Figure 1. In this hydraulic motor is the usual piston head 40 attached to a piston rod 41 likewise of the usual construction. On the other side of the chamber 13 from the port 36 is a port or motor passage 42 which is an enlargement of the bore 11. This port 42 is spaced a short distance from the fluid pressure chamber 13. The port is connected by the pipe 43 with the piston end 44 of the hydraulic motor.

Mounted in the bore 11 is a spindle 45 carrying lands 46, 47, 48 and 49. These lands are spaced from each other and each land is of greater diameter than the spindle and makes a substantially fluid tight engagement with the wall of the bore portion in which it is located.

Each land at the fluid control end thereof is provided with a metering slot 50. The slot is V-shaped and extends from the circumference of the land to the circumference of the spindle on which it is mounted.

Secured to the housing is a cap 53. This cap is in alinement with the bore 11 and the spindle 45 extends into the cap. Mounted on the spindle adjacent the housing is a washer 54. A second washer 56 is mounted on said spindle adjacent the end of the spindle and abuts against the cap 53. Between the washers 54 and 55 is a spring 57. This spring is so tensioned that the spindle is normally held in neutral or centered position. When the spindle is moved in one direction the spring will be compressed against the washer 54 by the washer 55 moving with the spindle. When the spindle moves in the opposite direction the spring will be compressed by the washer 54 moving with the spindle. At this time the washer 55 abuts against the shoulder in the cap 53. Thus it is that the spring when free to move will move the spindle until the washer 55 engages the abutment on the cap and the washer 54 engages the housing and at this time the spindle is in centered or neutral position shown in Figure 1. The spindle may be moved by any suitable manual means which is connected to the lug 58.

Disposed in the cap is a sleeve 60 which engages the abutment on the cap and when the spindle is moved upward as illustrated in Figure 1 of the drawings the movement thereof by the manual means will be limited by the washer 54 contacting the end of the sleeve. There is a second and shorter sleeve 61 mounted on the spindle within the spring 57. This sleeve moves with the spindle when it is manually shifted in a downward direction, and will limit the movement by contacting the washer 54. These sleeves serve as stops for the manual shifting of the spindle.

The bore 12 is provided with an enlarged port or motor passage 62 which is connected by a pipe 63 with the active end 64 of a one-way hydraulic motor 65 which is indicated diagrammatically in Figure 1. This motor 65 has a piston head 66 connected to a piston rod 67. A spring 68 returns the piston head to the outer end of the cylinder when the pipe 63 is connected to the exhaust chamber.

Mounted in the bore 12 is a spindle 69. The spindle carries lands 70, 71 and 73 which are spaced from each other on the spindle. Each land on the end thereof controlling fluid flow is provided with a metering slot 50.

Mounted in the housing 10 is a cap 72. The spindle 69 extends into the cap. Mounted on the spindle 69 adjacent the housing is a washer 74. There is also a washer 75 at the outer end of the spindle which is engaged by a nut 76. There is a coil spring 77 between the washers which normally holds the spindle in centered or neutral position. There is an inner sleeve 78 and an outer sleeve 79 one of which is shorter than the other and the sleeves function as stops for limiting the movement of the spindle by the manually operated means attached to the lug 80.

The land 71 on the spindle 69 when moved downward controls the flow of fluid from the fluid pressure chamber 13 to the port 62 and from the port 62 to the one-way operating motor 65.

When the spindle 69 is moved downward to effect a connection of the fluid pressure chamber 13 with the motor, the lower end of the land 71 will close the connection between the by-pass chamber 30 and the enlargement or port 28 of the bore 12. As previously described, this enlargement or port 28 is connected to the exhaust chamber 24 through the passage 29 as outlined hereinafter. When the spindle is raised to the position shown in Figure 1 then the connection from the pressure chamber 13 to the chamber 62 will be closed. This may be termed the neutral or centered position of the spindle and at this time the fluid will be retained in the motor and the load held lifted to a desired extent. When the land 71 moves to this neutral position, as shown in Figure 1, it will open the port connecting the by-pass chamber 30 through the enlarged bore 28 to the exhaust chamber and thus the pump output is freely bypassed to the tank 19. When the spindle 69 is raised to a further extent the land 70 will connect the chamber 62 with the branch 26 leading to the exhaust chamber. This connects the motor through the pipe 63 and the chamber 62 to the exhaust and permits the piston head to return to the end 64 of the motor cylinder.

The general arrangement in the previously described valve controlled unit is shown and described and novel features thereof are claimed in my copending application Serial No. 369,329, filed July 21, 1953, now Patent No. 2,783,745. The present invention has to do with an improvement in said valve controlled unit so that a plurality of units may be connected together in series when additional motors are to be used and all of the motors operated from a single source of supply. In carrying out the improvement the housing of the valve controlled unit is cored so as to provide a partition 80a separating the port or passage 29 from the exhaust chamber 24 (see Figs. 4 and 5). An opening or port 81 through the partition connects the port or passage 29 with the exhaust chamber 24. This port 81 is adapted to be closed by a plug 82 when it is desired to connect two or more of the units in series but is left unplugged or open when direct communication between the port or passage 29 and the exhaust chamber 24 is desired in the manner previously described. There is also a port 83 in the housing which is adapted to connect the port or passage 29 with the intake port of the next unit in series. Threaded into this port 83 is a pipe 84.

Figure 6:
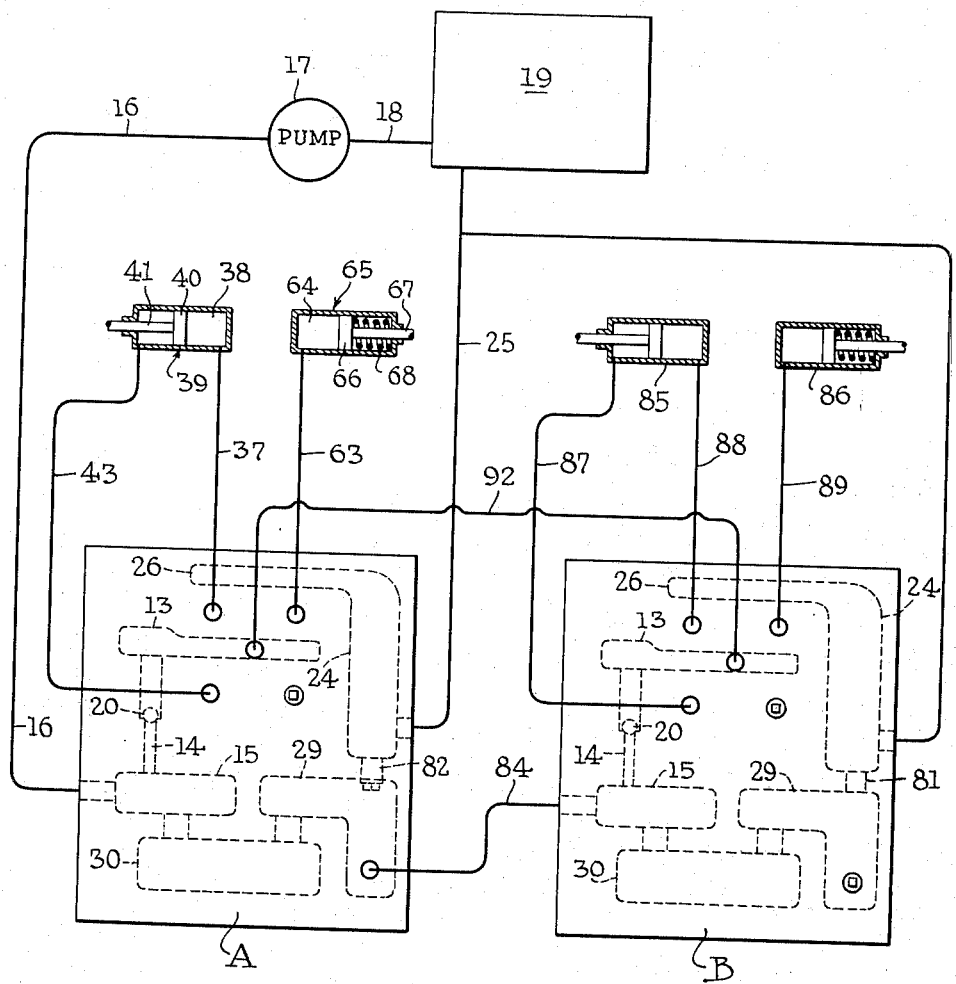
Figure 6 is a diagrammatic view showing a series of valve controlled units for a plurality of motors all operating from a single source of fluid supply.

In Figure 6 there is shown diagrammatically two of the improved units connected in series. These two units A and B are identical in construction. A pipe 84 leads from the unit A and connects the fluid pressure chamber 15 of unit A with the fluid pressure chamber 15 of unit B. This connection is through the chambers 30 and 28, the port or passage 29 to the pipe 84. At this time the plug 82 is inserted in the port 81 of unit A for closing the connection between the by-pass chamber 30 and the exhaust chamber 24. This pipe connection 84 may be used for supplying fluid to the unit B only when the valves of unit A are closed as shown in Figure 1. In this position the by-pass passage 11, 30, 28, 29 is open through 84, thereby communicating between the pressure chambers 15—15 of the units A and B. By the arrangement just described either valve in unit B may be opened for operating the associated motors 85 and 86 provided both of the valves in unit A are closed, that is, in neutral position, as shown in Figure 1. By this arrangement the valves in units A or B can be operated for controlling the motors 39 and 65 or the motors 85 and 86.

In order that the valves of all the units may be operated at the same time, that is, moved to open position, a pipe 92 has been provided for connecting the fluid pressure chamber 13 of unit A with the fluid pressure chamber 13 of unit B as shown in Figure 6. By this connection all the valves may be independently moved to open position or simultaneously moved to open position and there will be a fluid connection with the supply for the reason that the chambers 13 are always connected up with the supply regardless of the condition of the valves controlling the motors.

When the two pipes 84 and 92 are used for connecting the supply of the unit A with the unit B then the plug 82 is inserted in the port 81 of unit A for closing the connection between the auxiliary fluid pressure chamber 30 and the exhaust. This is necessary in order to get maximum fluid pressure for operating the motors associated with unit B. When the valves of both units are in closed or neutral position the fluid supply chamber 15 in unit A is connected through 11, 30, 28, 29 and 84 with the chamber 15 and like ports and passages with the exhaust chamber 24 of unit B and, therefore, the closing of all valves in both units unloads the pump so that no high pressure is developed in the system when all valves are thus placed in the neutral position. If the plug 82 of unit A is removed in the connection shown in Figure 6, the valves of the unit A might be operated and supply fluid at maximum pressure to the motors associated therewith but with this plug removed maximum fluid pressure cannot be supplied unit B when the valves of unit A are closed because the fluid pressure is still connected up to the exhaust chamber of unit A. By the use of two pipe connections 92 and 84 maximum fluid pressure can be furnished to a selected one or two of the motors associated with both units and at the same time the fluid pressure supply when all valves are closed will be connected to the exhaust so as not to overload the pump. Any number of units may be connected in series by utilizing connecting pipes 92 and 84 between all the units. The last unit in the series should have a free connection between the auxiliary fluid pressure or by-pass chamber 30 and the exhaust and, therefore, the plugs 82 of all the units except the last unit should be in closed position and in the last unit the plug should be removed.

From the above it will be noted that a control valve unit for hydraulic motors has been provided wherein the unit may be used by itself or may be connected in series with other similar units by the arrangement of certain ports and closure plugs therefor and also by providing pipe connections between the units.

It is obvious that changes may be made in the structure of the connected units but it is essential that there shall be a fluid pressure connection between the units at all times and that there shall be a means whereby the fluid pressure on the units is connected to the exhaust when the valves are all closed.

I claim:

1. In a control valve connectible with hydraulically operable motors for controlling operation of the same, a housing having a bore to slidably receive a valve element, a pair of exhaust passages intersecting the bore at spaced points and leading to a common exhaust chamber having an outlet port, a motor passage having outlet-inlet porting connectible with a motor to be operated and intersecting the bore adjacent one of said exhaust passages, a single high pressure supply chamber intersecting the bore in a single plane between said motor passage and one of said exhaust passages, an intake chamber connectible with a source of fluid under pressure and intersecting said bore outwardly of one of said exhaust passages, said intake chamber being connected to said supply chamber, a check valve between said intake and supply chambers and permitting flow of fluid only from the intake chamber to the supply chamber, a bypass passage intersecting the bore adjacent the intake chamber, a valve element slidable in said bore in opposite directions from a neutral position in which the bypass passage is open through the bore to the intake chamber but in which position communication between the motor chamber and said supply chamber and exhaust passages is blocked, to one or the other of two operative positions in one of which operative positions the valve element brings about communication between the motor passage and the supply chamber and in the other of said two operative positions the valve element brings about communication between the motor passage and one of the exhaust passages, and in which first mentioned operative position the by-pass passage is blocked at the bore by said valve element from communication with the intake chamber, a first passage connecting the bypass passage to the common exhaust chamber, a second passage leading from the bypass passage to the exterior of the housing, means for selectively opening and closing said first and second passages for establishing a connection between the bypass passage and either the common exhaust chamber or the housing exterior, as selected.

2. In a control valve connectible with hydraulically operable motors for controlling operation of the same, a housing having a bore to slidably receive a valve element, a pair of exhaust passages intersecting the bore at spaced points and leading to a common exhaust chamber having an outlet port, a pair of motor passages each having outlet-inlet porting connectible with a motor to be operated and intersecting the bore at spaced points between said exhaust passages and each adjacent one said exhaust passage, a single high pressure supply chamber intersecting the bore in a single plane between said motor passages, an intake chamber connectible with a source of fluid under pressure and intersecting said bore outwardly of one of said exhaust passages, said intake chamber being connected to said supply chamber, a check valve between said intake and supply chambers and permitting flow of fluid only from the intake chamber to the supply chamber, a bypass passage intersecting the bore adjacent the intake chamber, a valve element slidable in said bore in opposite directions from a neutral position in which the bypass passage is open through the bore to the intake chamber but in which position communication between the motor chambers and said supply chamber and exhaust passages is blocked, to an operative position communicating one or the other of the motor passages with the supply chamber and the remaining motor passage to the adjacent one of the exhaust passages, and in which operative position the bypass passage is blocked at the bore from communication with the intake chamber, a first passage connecting the bypass passage to the common exhaust chamber, a second passage leading from the bypass passage to the exterior of the housing, means for selectively opening and closing said first and second passages for establishing a connection between the bypass passage and either the common exhaust chamber or the housing exterior, as selected.

3. In a control valve connectible with hydraulically operable motors for controlling operation of the same, a housing having first and second bores to slidably receive first and second valve elements, a pair of exhaust passages intersecting both bores at spaced points and leading to a common exhaust chamber having an outlet port, a pair of motor passages for each bore, each said motor passage having an outlet-inlet port connection and said motor passages intersecting the respective bore at spaced points between said exhaust passages, a single high pressure supply chamber which intersects both bores in a single plane between the motor passages intersecting the particular bore, an intake chamber connectible with a source of fluid under pressure and intersecting the first bore outwardly of one of said exhaust passages, said intake chamber being connected to said supply chamber, a check valve between said intake and supply chambers and permitting flow of fluid only from the intake chamber to the supply chamber, a bypass passage intersecting the first bore outwardly of the intake chamber and also intersecting the second bore, a bypass extension passage intersecting the second bore adjacent the bypass passage, said intake chamber, bypass passage, and bypass extension passage constituting a through passage, a first valve element slidable in the first bore and a second valve element slidable in the second bore, said valve elements being slidable in opposite directions from a neutral position in which the through passage is open at the respective bore and in which position communication between the respective motor passages and said supply chamber and exhaust passages is blocked, to an operative position in which one of the motor passages controlled by at least one of the valves is open to the supply chamber and the other motor passage controlled by said one valve is open to an exhaust passage, and in which operating position the through passage is blocked at the respective bore, a first passage connecting the bypass extension passage to the common exhaust chamber, a second passage leading from the bypass extension passage to the exterior of the housing, means for selectively opening and closing said first and second passages for establishing a connection between the bypass extension passage and either the common exhaust chamber or the housing exterior, as selected.

4. A valve unit structure as defined in claim 3 wherein the first passage connecting the bypass extension passage to the common exhaust chamber and the second passage leading from the bypass extension passage to the exterior of the housing are formed in spaced parallel walls, and the selective opening and closing means comprise selectively mountable screw plugs mountable in and removable from threaded bores in said parallel walls.

5. A valve unit structure as defined in claim 3 wherein the first passage connecting the bypass extension passage to the common exhaust chamber and the second passage leading from the bypass extension passage to the exterior of the housing are formed in spaced parallel walls, and the selective opening and closing means comprise selectively mountable screw plugs mountable in and removable from threaded bores in said parallel walls, the threaded bore in the wall leading to the exterior of the housing being larger than the threaded bore in the paralleling wall so that the screw plug for selectively closing the threaded bore in said paralleling wall can be mounted or dismounted by manipulation through the otherthreaded bore.

References Cited in the file of this patent

UNITED STATES PATENTS

| | | |
|---|---|---|
| 2,431,944 | Lauck et al. | Dec. 2, 1947 |
| 2,586,932 | Gardiner et al. | Feb. 26, 1952 |
| 2,745,433 | Schneider et al. | May 15, 1956 |
| 2,783,745 | Stephens | Mar. 5, 1957 |